United States Patent [19]
Layne et al.

[11] Patent Number: 6,129,202
[45] Date of Patent: Oct. 10, 2000

[54] REDUCED DRAG SIDE FLEXING CONVEYOR SYSTEM

[75] Inventors: James L. Layne, Bowling Green; Wendell S. Bell, Smiths Grove; Michael D. McDaniel; Mark T. Johnson, both of Glasgow, all of Ky.

[73] Assignee: Span Tech LLC, Glasgow, Ky.

[21] Appl. No.: 09/025,467

[22] Filed: Feb. 18, 1998

[51] Int. Cl.⁷ ............................ B65G 15/02; B65G 21/16
[52] U.S. Cl. .......................... 198/831; 198/840; 198/842
[58] Field of Search ................................. 198/831, 840, 198/842

[56] References Cited

U.S. PATENT DOCUMENTS

| | | | |
|---|---|---|---|
| 811,991 | 2/1906 | Acklin | 198/842 |
| 3,094,206 | 6/1963 | Stewart et al. | |
| 3,155,226 | 11/1964 | Beiler | 198/831 |
| 3,946,857 | 3/1976 | Fraioli, Sr. | |
| 4,276,980 | 7/1981 | Oizumi | |
| 4,576,277 | 3/1986 | Park et al. | |
| 5,038,925 | 8/1991 | Chrysler | |
| 5,332,082 | 7/1994 | Sommerfield | 198/842 |
| 5,573,105 | 11/1996 | Palmaer | |

Primary Examiner—Christopher P. Ellis
Assistant Examiner—Joe Dillon, Jr.
Attorney, Agent, or Firm—King and Schickli, PLLC

[57] ABSTRACT

A modular conveyor system having an improved side flexing conveyor belt and improved active guide rail is provided. One or more roller assemblies replace the passive inside or outside guide rails in a curved section of the conveyor system for reducing the drag force on the conveyor belt as it negotiates the curve. Pairs of articulated members interconnect roller assemblies and allow the relative angular position of each to be selectively adjusted. The improved side flexing conveyor belt includes side links having a curved skirt which bridges the gap between the side links, thereby providing a continuous bearing surface for smooth operation. The skirts of adjacent links engage each other in edge-to-edge contact to prevent the tendency to sag, as well as assisting the conveyor belt in ramping up and down and the retention of the conveyor belt along a return run.

13 Claims, 4 Drawing Sheets

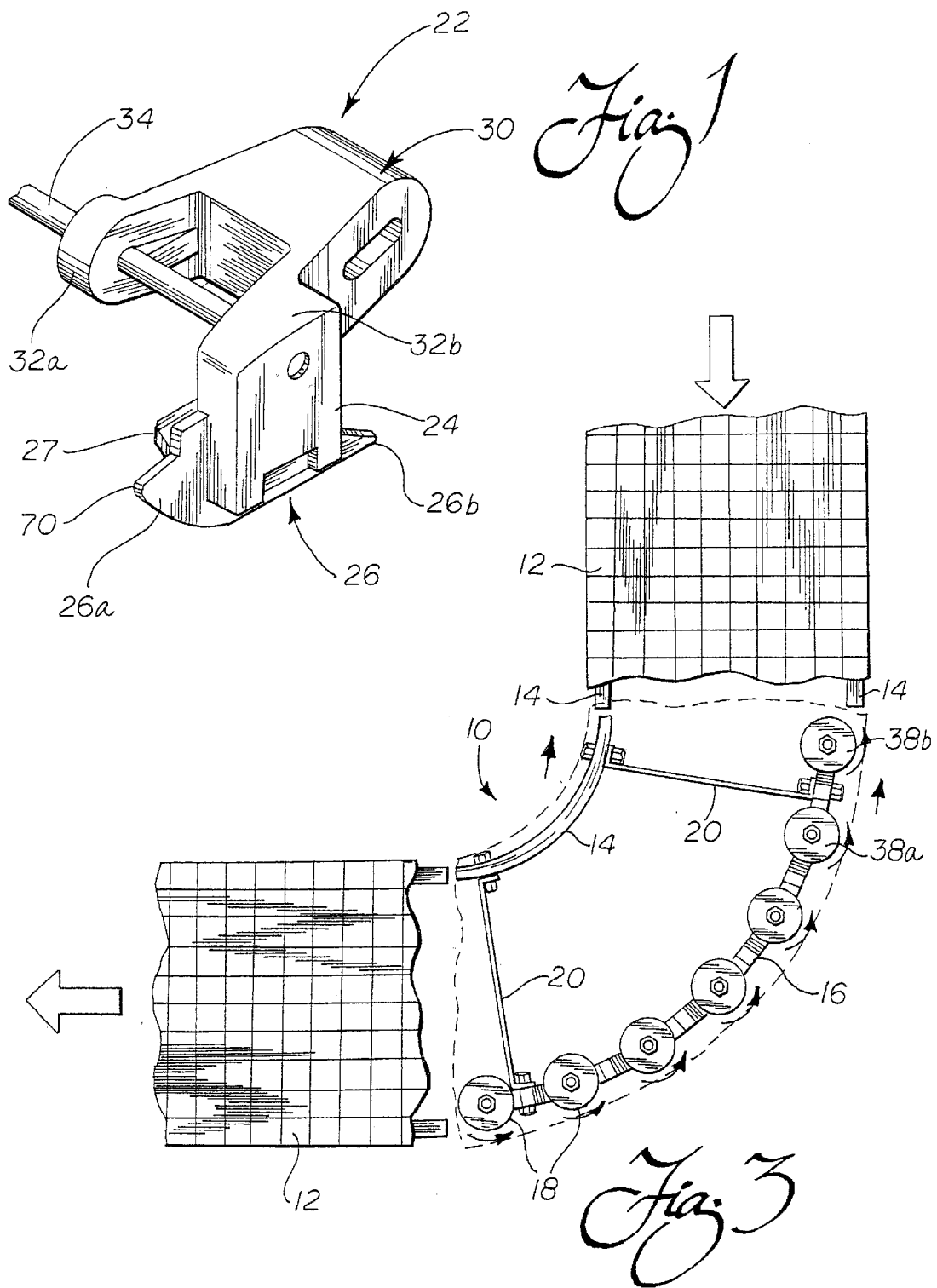

REDUCED DRAG SIDE FLEXING CONVEYOR SYSTEM

TECHNICAL FIELD present invention relates generally to conveyor systems and, more particularly, to a side flexing modular link conveyor system having improved construction and operating characteristics.

BACKGROUND OF THE INVENTION

Conveyor systems are an integral part of modern production facilities. Such systems are especially beneficial in the food processing and article packaging industries, where it is often desirable to move articles to and from different areas of the production facility to undergo various manufacturing/packaging operations. Due to constraints, such as limitations in floor space, it is often necessary to provide bends or curves in the conveyor system to move articles in a desired direction for positioning at a specific location.

A significant problem encountered with present day modular link conveyor belts is concerned with the substantial increase in the drag force in curves as the linear speed of the conveyor increases. Specifically, the inner side links of the belt are compressed upon entering the curve and the outside links are expanded. These competing forces place the conveyor belt in lateral tension along the radius of the curve. This tension, in turn causes the outer links to press against the outer guide rail, which is usually simply a curved, stainless steel channel. It is known that this contact creates the deleterious "hot spots" as the frictional drag force on the conveyor belt escalates. Left unchecked, the frictionally generated heat eventually causes the plastic depending arm of the side link to soften, which can lead to failure.

Even if the speed is reduced sufficiently to avoid failure, the frictional drag force reduces the operating efficiency of the system itself, since more power is required to overcome this force. Even if the heat rise is controlled, the side links of the conveyor belt wear more rapidly, which further increases the incidence of link or belt failure. These difficulties inevitably lead to costly production downtime.

Conventional attempts to reduce the troublesome drag force have met with little success. For instance, it is well-known that providing a constant source of lubrication to the curved guide rails can temporarily reduce friction and the resulting drag force. However, for many production operations, such as food processing, the presence of industrial lubricants presents a significant problem, as the food product is subject to contamination. The lubricants readily trap loose food product and, thus, create an unsanitary residue which provides a breeding ground for bacteria or the like. Furthermore, because of the requirement for frequent washing to meet governmental regulations, even if the lubricant is ruled safe to be around the food product, the cost of frequent reapplication to the rails is prohibitive.

One early proposal for overcoming the above mentioned problems associated with drag force is taught in U.S. Pat. No. 3,094,206 to Stewart. This reference discloses a flexible wire conveyor belt having a pair of centrally-located depending legs with shoulders which track along a series of rollers secured near the center of the conveyor frame. While this proposal seeks to reduce the drag force by substituting rollers for the conventional passive or static guide rail, it is apparent that such a design lacks the stability that is required in modern operations, especially during high speed belt operation. Specifically, the presence of a single guide rail in the center fails to consistently maintain the belt flat, thus leaving the belt edges free to flex upwardly and away from the conveyor support frame.

Modern efforts to improve the tribological characteristics in modular-type conveyors have moved away from the teaching of the '206 patent and have instead sought to alleviate the problem by redesigning the conveyor belt itself. Most, if not all, of such proposals involve the attachment of rollers directly to the underside of the belt to reduce the drag force. During operation, these rollers track along one or more passive guide rails in an attempt to guide the belt along the curve with less friction. For example, U.S. Pat. No. 5,573,105 to Palmaer discloses a modular link conveyor belt having a plurality of rollers carried under the belt. These rollers also engage a center rail. A similar example of such a design is U.S. Pat. No. 5,038,925 to Chrysler, which teaches the use of a conveyor belt having split rollers mounted along its peripheral edge for engaging a passive guide rail.

While these proposals are improvements over conventional approaches, such as the concept of applying a lubrication substance, several limitations still remain. The complexity and expense of the conveyor belt is the main drawback, since the cost of construction more than doubles. Furthermore, with the number of rollers increasing by ten/twenty fold or more, the chances of failure leading to downtime are greatly increased. Also, from a sanitary viewpoint, these extra rollers increase the problem of cleaning the belt to meet the governmental standards.

Still others propose external modifications to the conveyor belt. For example, in U.S. Pat. No. 3,946,857 to Fraioli, Sr., a series of rollers are mounted along the periphery of the conveyor belt for tracking along a passive guide rail. However, it is readily apparent from viewing this proposed design that similar limitations remain; namely, complexity and cost of design, increasing incidence of belt failure, and complicating the cleaning process.

In addition to negotiating curves, it is often beneficial to provide the conveyor belt with up/down ramping capabilities. This added dimension of travel not only provides significant flexibility in moving articles to and from production areas, such as where the work stations have different height requirements, but also where there are different levels of the production facility itself.

Thus, a need exists for a side flexing, modular conveyor system with improved operating characteristics. Such an improved system would be simple in design, inexpensive to construct and maintain, and would include the ability to smoothly and efficiently negotiate horizontal curves or bends by substantially reducing the troublesome drag force associated with passive guide rails. Additionally, the belt would be provided with an improved ability to ramp up and down smoothly and reliably. Further, the improved system and its conveyor belt would lend itself to more efficiently traveling along the return run.

SUMMARY OF THE INVENTION

Thus, it is a primary object of the present invention to provide a side flexing modular link conveyor system having an improved construction and tribological characteristics that overcome the above described limitations and disadvantages of the prior art conveyor systems.

An additional object of the invention is to provide such a conveyor system having an active guide rail that significantly reduces the frictional drag on the conveyor belt as it negotiates a curve, thereby providing smooth and efficient operation.

Still another object is to provide such a conveyor system having an active guide rail that is selectively adjustable for use in a variety of curves.

Yet another object is to provide such a conveyor system with a side flexing modular link conveyor belt having improved side links that engage a series of roller assemblies in an advantageous manner along one or both edges of the conveyor to enhance the speed of operation.

Still a further object is to provide such a side flexing, modular link conveyor belt having improved side links that also allow the belt to ramp up and down more efficiently, and also to assist in supporting the belt along the return run.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a conveyor system having an improved design exhibiting enhanced tribological characteristics is provided. As a result, the system achieves a more efficient motion of the side flexing, modular link conveyor belt that forms a component of the system. The improved operation, and the resultant longer life, comes primarily as a result of reducing the frictional drag force around curves of the conveyor. An improvement to the conveyor belt itself and the side links are also features of the present invention.

Generally, a modular link conveyor belt is formed by interconnecting a plurality of modular links. A complete description of this type of belt, and an associated conveyor system, is disclosed in Applicant's U.S. Patent 4,953,693 to Draebel, entitled, "Modular Link Conveyor System." The disclosure of this patent is incorporated herein by reference.

In accordance with an important aspect of the present invention, the improved conveyor system includes providing at least one active guide rail including one or more roller assemblies for guiding a modular link conveyor belt. This guide rail is positioned along either the inside or the outside of any curved section of the conveyor system. Although providing an active guide rail along both the inside and outside curve is contemplated, the preferred embodiment is directed to guiding along the outside rail. It should be appreciated that where only one active guide rail is present, the other may be a passive guide rail of a type known in the art. A description of such a passive guide rail in the form of an outwardly directed channel is found in Applicant's '693 patent, noted above.

Preferably, each roller assembly comprises an upper roller for directing the upper or production run of the belt, and a lower roller for the return run. Each roller is rotatably mounted on a spindle. The individual rollers have a circumferential groove which defines a pair of spaced disks. The periphery of each disk provides a bearing surface that rolls substantially friction free over spaced inwardly directed guide surfaces of the vertically depending portion of each link. More specifically, the inside facing surfaces of the groove slidingly engage and capture the top and bottom surfaces of the inwardly projecting tab of the side link. As can be appreciated, the upper roller of each assembly thus serves to actively guide the conveyor belt with minimum frictional drag force as it travels on the forward or production run, while the lower roller serves to similarly guide and support the belt along the return run. Advantageously, the active rotation of the rollers serves to reduce the frictional drag force exerted on the conveyor belt, whereby the allowable speed of travel can be significantly increased. The belt traverses a curve or bend in the conveyor system without being subject to excessive wear. The generation of frictional heat is also greatly reduced at any point in the system.

In the preferred embodiment, a plurality of such roller assemblies are interconnected to form the active guide rail. Specifically, a series of articulated members are coupled together between adjacent pairs of roller assemblies using the spindles as the coupler. Since the articulated members are attached to the spindle in a pivotal relationship, the relative angular position between the roller assemblies can be selectively adjusted. This advantageously allows the plurality of roller assemblies and, more particularly, the active guide rail, to adapt to a variety of different curved sections of conveyor.

Additionally, the improved conveyor system includes one or more radial cross brackets, preferably fabricated of rigid sheet metal, for supporting the active guide rail. These cross brackets extend between the inside and outside guide rails, whether both active or active/passive. If desired, the brackets can be adapted to allow for the adjustment of the relative position of the guide rails. Support for the conveyor system itself is provided by any means well-known in the art, such as upstanding legs that connect to the frame.

According to another important aspect of the present invention, an improved side link is provided for assisting in guiding and supporting the conveyor belt. In the preferred embodiment, the depending arm portion of each side link is provided with a curved skirt. The curved skirt includes a forwardly projecting fin and a rearwardly projecting fin. The side links form the outer edges of the conveyor belt and interconnect with modular links to provide a conveying surface.

In operation, the forwardly projecting fin of a trailing link overlaps in close proximity with the rearwardly extending fin of a leading link at any moment in time. As can be appreciated, this overlap of these fins forms a curved juncture that serves to bridge the gap between the consecutive side links. This provides the conveyor belt with several enhanced operational capabilities.

First of all, the curved skirt assists in allowing the conveyor belt to smoothly traverse a bend or curve since at the curved juncture between the fins, the roller remains in contact with the skirt of the leading link, as contact is initially made with the trailing link. Secondly, the edges of the fins of adjacent links are also allowed to contact each other. This advantageously provides cooperative edge-to-edge support in the event there is temporary sagging of the belt. In this way, any tendency of the belt to disconnect from the guide rail is avoided.

The fins of consecutive side links also provide improved ramping capabilities. Preferably, as the belt ramps up an incline, each forwardly projecting fin of the trailing link rotates in a backward fashion such that it mates with the rearwardly projecting fin of the leading link. This edge-to-edge engagement advantageously serves to support and guide each successive link during such a ramping operation. A similar benefit is provided when the belt is ramping down a decline.

It must also be appreciated that the cooperative curved skirt edge-to-edge engagement advantageously improves operation during the return run. As the belt is inverted, the rearwardly projecting fin of the skirt of the leading link at any moment in time can be supported on the forwardly projecting fin of the trailing link. This assures that any tendency of the individual links to sag as they traverses between the roller assemblies of the active guide rail is corrected.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention and, together with the description, serve to explain the principles of the invention. In the drawings:

FIG. 1 is a top plan view of the improved conveyor system of the present invention, showing a cutaway view of the roller assemblies which comprise the active guide rail positioned along the outside of a curve;

FIG. 3 is an enlarged perspective view of the improved side link of the present invention, including the curved skirt which serves to bridge the gap between consecutive links;

Reference will now be made in detail to the present preferred embodiment of the invention, an example of which is illustrated in the accompanying drawings.

DETAILED DESCRIPTION OF THE INVENTION

Figure 2:
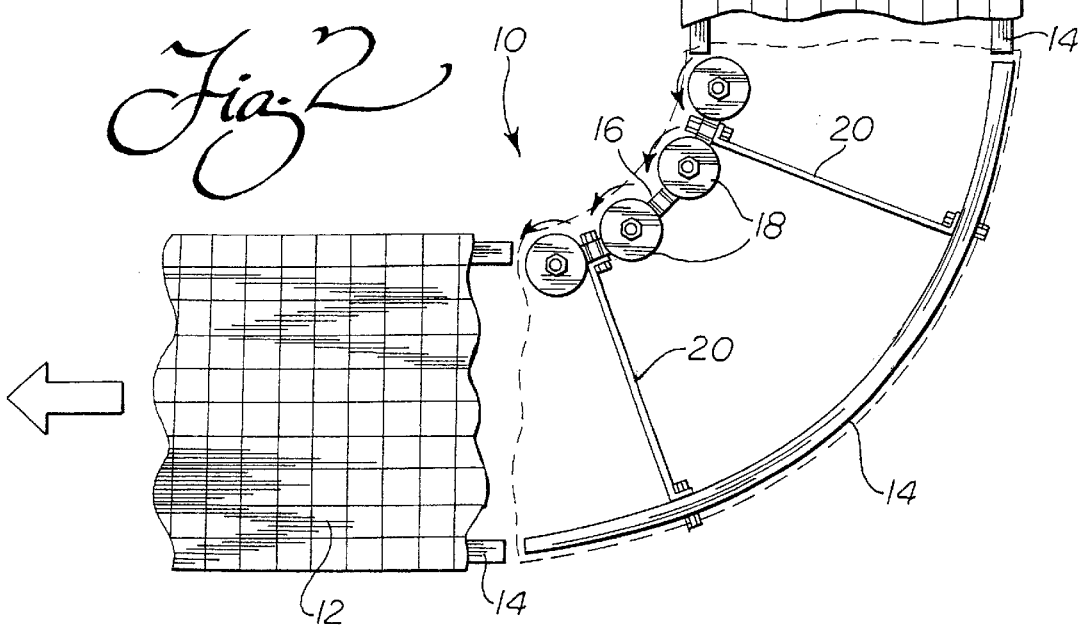
FIG. 2 is a similar, cutaway view showing the roller assemblies positioned along the inside of a curve.

Reference is now made to FIGS. 1 and 2 illustrating the improved side flexing modular link conveyor system 10 of the present invention. As will become apparent after reviewing the description below, the system 10 provides smooth and continuous motion for a side flexing modular link conveyor belt 12 as it traverses a variety of degrees of curvature, including even relatively sharp bends, or as it ramps up or down. For purposes of illustration, the system 10 is shown as having a curved section and, more particularly, a 90° corner.

The improved conveyor system 10 includes a pair of guide rails 14, 16 for guiding and supporting the belt 12 as it traverses a curve. In the preferred embodiment, a passive guide rail 14 is mounted along the inside and an active guide rail 16 is mounted along the outside of the curve. As specifically shown in FIG. 2, the passive and active guide rails 14, 16, respectively, may be interchanged such that the active guide rail 16 is on the inside. As can be appreciated, providing active guide rails along both the inside and outside curves (not shown) is also a viable alternative within the broadest aspects of the present invention.

The active guide rail 16 includes one or more roller assemblies 18. Although it is contemplated that one roller assembly 18 may provide the active guiding function to the conveyor belt 12, the preferred embodiment includes a plurality of interconnected roller assemblies 18 that are selectively adjustable to fit a given curve. As is described in more detail below, these roller assemblies 18 are supported, in part, by radial cross brackets 20 which extend between the guide rails.

Figure 4:
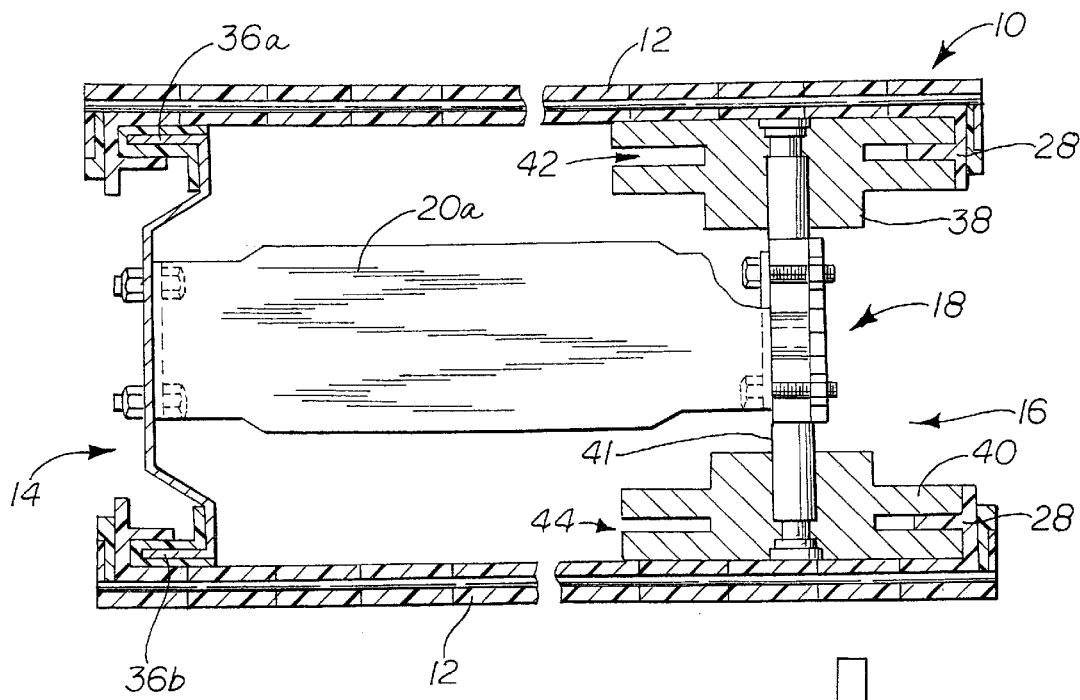
FIG. 4 is a cross-sectional view of the conveyor system taken along line 4—4 of FIG. 1, with roller assemblies disposed along the outside of a curved section and the passive guide rail along the inside.

In accordance with another aspect of the present invention, the modular link conveyor belt 12 is provided with an improved side link 22. As shown in FIG. 3, the side link 22 is formed with a depending arm 24 having a curved skirt 26. This skirt 26 includes a forwardly projecting fin 26a and a rearwardly projecting fin 26b, the function of which will be described in more detail below. The side link 22 is also provided with an inwardly projecting transverse tab 28 which serves to slidingly engage each of the roller assemblies 18. Additionally, as is described more fully in Applicant's '693 patent, the side link 22 includes an apex 30 and a pair of legs 32a, 32b forming its body. A transverse connecting member 34 cooperates with the other links across the belt 12 (as shown in FIGS. 1 and 4) to form the conveying surface. The improved side links 22 are formed of ultra high molecular weight (UHMW) composite plastics, including such common plastics as Nylon 6-6 and/or other durable, food-grade plastic materials that have favorable tribological characteristics. The intermediate links are preferably molded of a less costly plastic material, such as acetal.

The interrelationship of the elements of the improved conveyor system 10 of the present invention is best shown in FIG. 4. The passive guide rail 14 is provided with upper and lower lips 36a, 36b that include a plastic wear strip defining the forward and return runs of the conveyor system along this side. These lips with wear strips are embraced between the underside of the link 22 and the inwardly extending transverse tabs 28. In the curve section shown, this structure guides the conveyor belt 12 along the inside of the curve. In other words the wear strip of the upper lip 36a serves to guide the conveyor belt 12 along a forward run, while the wear strip of the lower lip 36b guides the belt along a return run. The passive guide rail 14 is preferably formed of stainless steel, although the use of other corrosion-resistant, but durable, materials is possible.

Each roller assembly 18 includes an upper and lower roller 38, 40. These rollers 38, 40 are rotatably mounted on a spindle 41 using ball or roller bearing assemblies of a type well-known in the art. A groove 42, 44 is formed along the circumference of each roller 38, 40, respectively, and serves to define a pair of spaced disks. As should now be appreciated, the plurality of interconnected roller assemblies 18 form both a series of upper and a series of lower rollers, each series serving to guide the belt 12 during a forward run and return run, respectively.

With regard to the active guidance provided by each roller 38, 40, the circumferential groove 42, 44 is designed to capture the transverse tab 28 of each side link 22. As can be appreciated, during operation the opposing inner surfaces between the spaced disks provide bearing surfaces for slidingly engaging each transverse tab 28 in sequence. Also, the periphery of each disk 38, 40 provides a bearing surface for contacting the inside face of the depending arm, as well as the curved skirt 26 of each side link 22, as it traverses the curve. The individual rollers 38, 40 are made of UHMW plastic, such as Nylon, high density polyethylene or a similar plastic material having a relatively high degree of lubricity with respect to the chosen link material, thereby further improving the tribological characteristics of the system 10.

Figure 5:
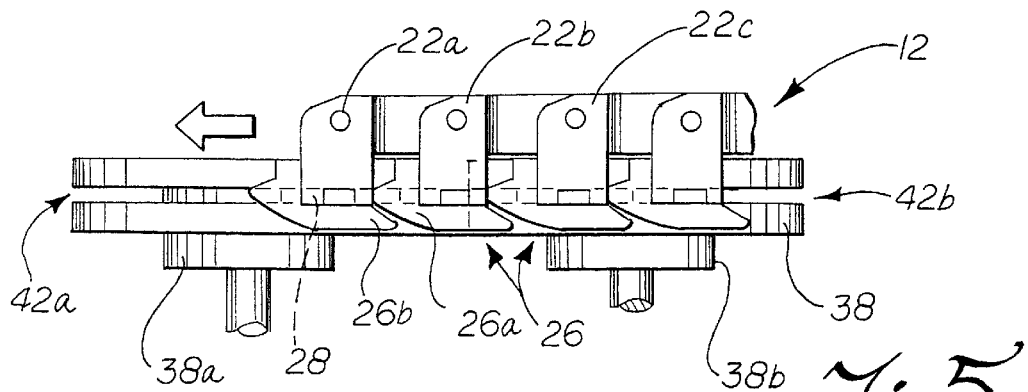
FIG. 5 is a side view of consecutive side links engaging the upper rollers of a pair of connected roller assemblies during a forward run of the conveyor belt.

As is shown in FIG. 5, during operation, the transverse tab 28 (shown in phantom) of a leading side link 22a (see also FIG. 4) engages the circumferential groove 42a of a first upper roller 38a. As the belt 12 traverses the curve (see horizontal action arrow), a trailing side link, such as the link 22c, is in sliding engagement with the similar groove 42b of a following upper roller 38b.

Figure 6:
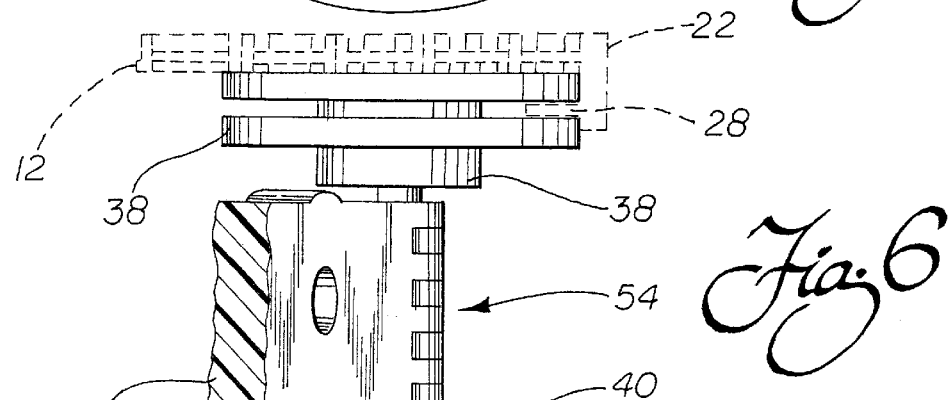
FIG. 6 is a side view of a roller assembly that forms the active guide rail, including a cross-sectional view of an articulating member which serves to interconnect the roller assemblies.

During the forward run, this sliding engagement causes each roller 38 to rotate in a direction (as shown by the action arrow in FIG. 6). As should be appreciated, the lower roller 40 rotates in an opposite direction to accommodate the return run (see lower action arrow). As described in more detail below, the curved skirt 26 of each side links 22 advantageously serves to support and guide an intermediate link 22b between the leading 22a and trailing 22c links as the belt traverses the curve.

Figure 7:
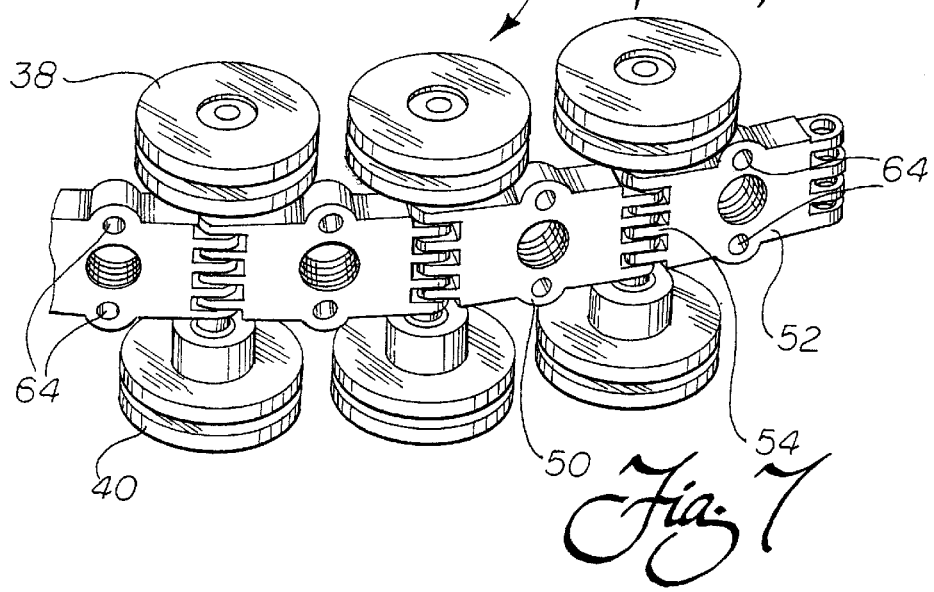
FIG. 7 is a perspective view showing the manner in which a series of articulated members interconnect to allow for the adjustment of the relative angular position of the roller assemblies.

Referring now to FIGS. 6 and 7, the manner in which a plurality of roller assemblies 18 are interconnected to provide an active guide rail 16 is demonstrated. A series of articulated members 50, 52 are attached by the spindles 41 which support the rollers 38, 40. Specifically, the articulated members 50, 52 are coupled by an interdigitating joint 54. The fingers of the joint are held together by the spindle 41. As can best be seen in FIG. 7, this allows each pair of articulated members 50, 52 to pivot about the corresponding spindle 41 for adjusting the relative angular position (see FIG. 7). Thus, the articulated members may advantageously be adjusted to provide an active guide rail 16 along a variety of curves.

As is specifically shown in FIG. 7, each articulated member 50, 52 is provided with a pair of spaced apertures 64 for acceptance of a pair of fasteners to connect the radially-extending cross bracket 20. The combination between the cross bracket 20 and each of selected articulated members 50, 52 allows the relative position of the inside and outside guide rails 14, 16 to be fixed. If desired, an adjustable section of the bracket 20, or shims (not shown) can be added so that the position of the outside guide rail 16 can be finely adjusted. In the preferred embodiment, the bracket 20 is fabricated of relatively rigid sheet metal, such as stainless steel. Support for the conveyor system 10 is provided by any means well-known in the art, such as legs which attach to the frame (not shown).

In accordance with another important aspect of the present invention, each modular side link 22 is provided with a curved skirt 26 for assisting in the smooth transition from one link to another across the rollers 38, 40 and for supporting the links to prevent sagging, especially during up/down ramping and along the return run. The curved skirt 26 of each side link includes a forwardly extending fin 26a and a rearwardly extending fin 26b. Referring again to FIG. 5, in operation, the forwardly projecting fin 26a of the trailing link 22b overlaps in close proximity with the rearwardly extending fin of 26b of the leading link 22a at any moment in time. As can be appreciated, this overlap forms a curved juncture that serves to bridge the gap between the consecutive side links 22a, 22b, 22c. As briefly noted above, this provides the conveyor belt 12 with the two enhanced operational capabilities.

First of all, insofar as the smooth transition function is concerned, the curved juncture between the fins 26a, 26b allows the roller 38 to remain in contact with the skirt 26 of the leading link 22a, as contact is initially made with the trailing link 22b. Secondly, the edges of the fins of adjacent links 22a, 22b are also allowed to contact each other. This advantageously provides the cooperative edge-to-edge support in the event there is temporary sagging of the belt 12. In this way, any tendency of the belt 12 to disconnect from the guide rail 14, 16 is avoided.

Figure 8A:
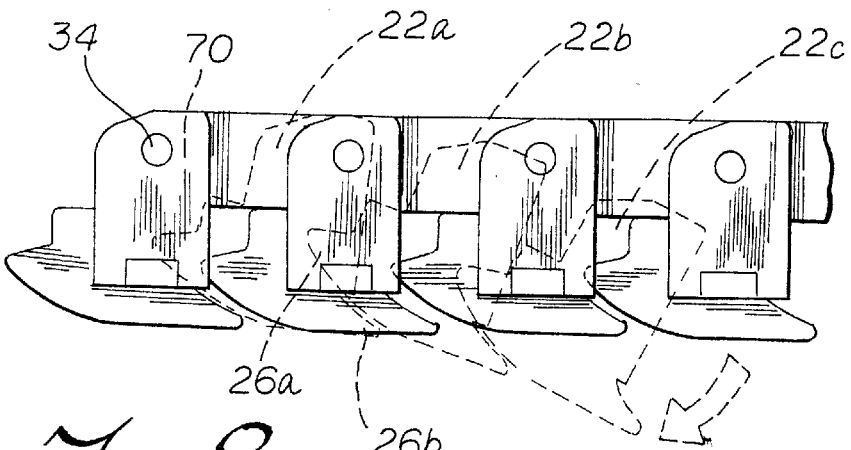
FIG. 8a is a side view of a modular link conveyor belt ramping upward (at the top of the ramp), showing the manner in which the forwardly projecting fin of a first or leading side link cooperates with the rearwardly projecting fin of a second or trailing side link.
Figure 8B:
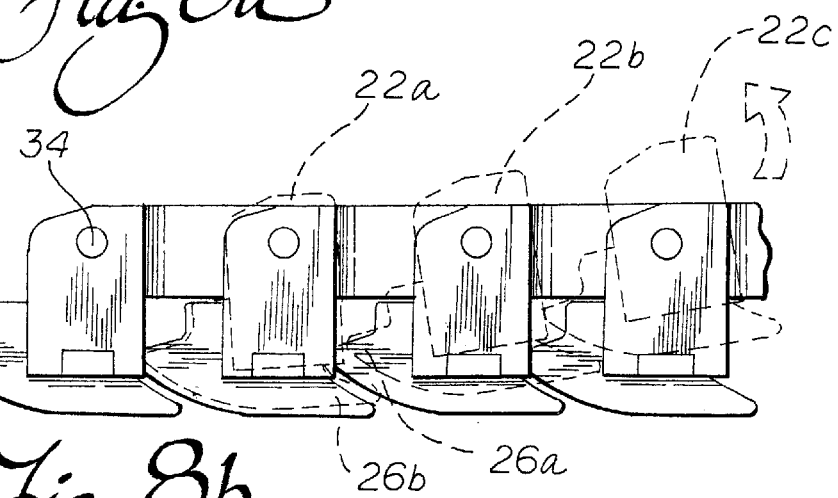
FIG. 8b is a similar side view showing the engagement of the fins, but the conveyor belt ramping downward (at the bottom of the ramp)

The fins 26a, 26b of consecutive side links also provide the improved ramping capabilities mentioned above in a unique manner. As shown in FIG. 8a, when the belt 12 ramps up an incline, at the top of the incline each forwardly projecting fin 26a of the trailing link 22b has rotated in a backward fashion, such that it mates with the rearwardly projecting fin 26b of the leading link 22a (see phantom action arrow). Thus, this edge-to-edge engagement advantageously also serves to support and guide each successive link 22a, 22b, 22c. As shown in FIG. 8b, this engagement provides a similar advantage when the belt 12 is ramping down a decline (shown at the bottom).

Figure 9:
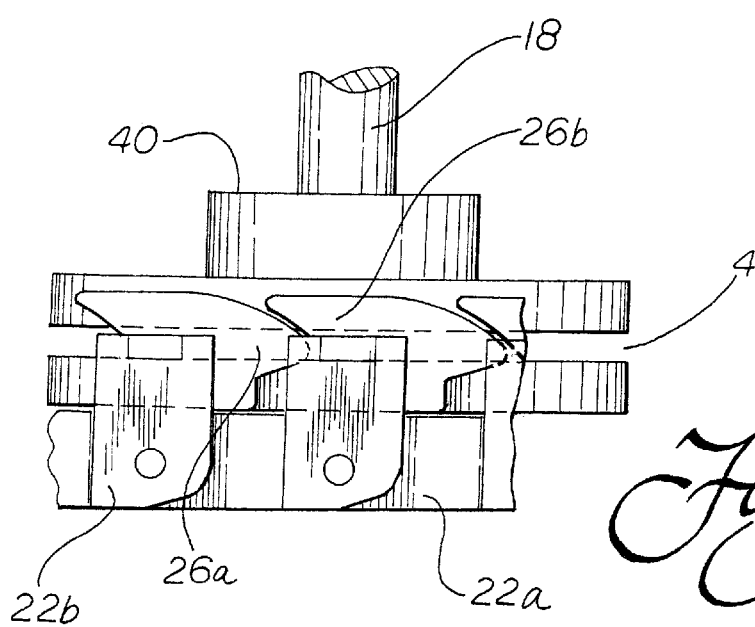
FIG. 9 is an enlarged side view of links along the return run, showing the curved skirt of the side links assisting in supporting the conveyor belt.

As best illustrated in FIG. 9, the overlapping skirts providing the curved juncture, and the edge-to-edge engagement of the cooperative curved skirts 26 also improves the smoothness of the transition from one link to the next, as well as the anti-sagging function, during the return run. As the belt 12 is inverted, the rearwardly projecting fin 26b of the leading link 22a at any moment in time may be at least partially supported on the edge of the forwardly projecting fin 26a of the trailing link 22b. This advantageously assures that any tendency of the individual links to sag, as they traverse between the roller assemblies 40 of the active return guide rail is corrected.

Referring back to FIG. 1, the operation of the preferred embodiment of the improved conveyor system 10 of present invention is now briefly described. A side flexing endless modular link conveyor belt 12 is travelling along a straight section of the system 10 in the direction shown by the action arrows. The conveyor belt 12 is preferably driven by a conventional electric motor and sprocket combination (not shown). As the belt 12 enters a curved section of the conveyor system 10, the inside guide surface of the arm 24 and transverse tab 28 of the leading link 22 leaves the passive guide rail 14 of the abutting straight section and engages the first in-line upper roller 38b (see FIG. 5). This engagement, including the outward bearing force of the outer peripheral face of the roller, and the sliding engagement of the tab in the groove 42b causes the upper roller 38b to rotate in the direction shown by the action arrows in FIGS. 1, 5 and 6. This rotation advantageously provides the active guidance to the forward run of the belt 12 as it traverses the curve. As described above, the rotation serves to substantially reduce the friction and the concomitant drag force. As the belt 12 continues along the curve, each successive roller 38a serves to provide similar guidance and support. Also, the corresponding lower rollers 40 serve to similarly guide/support the return run, thereby advantageously reducing the frictional drag force and preventing sagging along the entire endless conveyor system.

Other possible modifications to the system 10 include providing each pair of the articulated members 50, 52 with a spanner bracket 66 (see FIGS. 6 and 7). Such a bracket provides the dual function of providing rigidity to the active guide rail 16, while also serving along with the cross brackets 20 to fix the position the articulated members 50, 52, thereby preventing misalignment from occurring during operation. The spanner brackets 66 may be mounted along the inside or outside of the articulated members 50, 52, or may be alternated. Additional brackets (not shown) for securing the end of the active guide rail 16 to abutting sections of the passive guide rail may also be provided.

In summary, a conveyor system 10 having an improved side flexing modular link conveyor belt 12 and an improved guide rail 16 is provided. Roller assemblies 18 having upper and lower rollers 38, 40 provide active guidance to the belt 12 (see FIGS. 1 and 2). The rollers serve to reduce the drag force around a curve. A series of articulated members 50, 52 are provided to interconnect the roller assemblies 18, thereby allowing the relative angular position of each to be selectively adjusted to fit a given curve (see FIGS. 6 and 7). Also, an improved side flexing modular link conveyor belt 12 includes side links 22 which have a curved skirt 26 for bridging the gap between successive links (see FIG. 3). The curved skirt 26 provides the additional functions of: (1) shared support between adjacent side links 22 to alleviate the tendency for individual links to sag along the forward run; (2) assisting the conveyor belt 12 in ramping up and down (see FIGS. 8a and 8b); as well as, (3) preventing sagging and retention of the belt 12 along a return run (see FIG. 9).

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A support apparatus for a side-flexing, endless modular link conveyor belt including side links having a depending arm with an inside guide face and an inwardly extending transverse tab, comprising:
   a guide rail for guiding the side links at a first side of the conveyor belt, said guide rail engaging the inside guide face and the transverse tab of the first side links; and
   at least one roller assembly for actively guiding the side links at a second side of the conveyor belt, said roller assembly engaging the inside guide face and the transverse tab of the second side links.

2. The apparatus of claim 1, wherein said roller assembly includes an upper roller and a lower roller, each of said rollers having a pair of spaced disks which define a circumferential groove for engaging the transverse tab of the side links.

3. The apparatus of claim 2, wherein the transverse tab of each of the side links slidingly engages said circumferential groove of each of said upper and lower rollers.

4. The apparatus of claim 2, wherein said roller assembly assists in actively guiding the conveyor belt as it traverses a curved section of a conveyor system.

5. The apparatus of claim 4, wherein said passive guide rail extends along the inside of said curved section and said active roller assembly is positioned adjacent to the outside of said curved section.

6. The apparatus of claim 4, wherein said active roller assembly is positioned adjacent to the inside of said curved section and said guide rail extends along the outside of said curved section.

7. A support apparatus for a side-flexing, endless modular link conveyor belt including side links having a depending arm with an inside guide face and an inwardly extending transverse tab, comprising:
   a guide rail for guiding the side links at a first side of the conveyor belt, said guide rail engaging the inside guide face and the transverse tab of the first side links; and
   a plurality of roller assemblies for actively guiding the side links at a second side of the conveyor belt, each of said roller assemblies engaging the inside guide face and the transverse tab of the second side links.

8. The apparatus of claim 7, wherein said plurality of roller assemblies assist in actively guiding said conveyor belt as it traverses a curved section of a conveyor system.

9. The apparatus of claim 8, wherein each of said roller assemblies comprises:
   a spindle; and
   an upper roller and a lower roller rotatably mounted to said spindle, each of said rollers having spaced disks defining a circumferential groove for engaging said transverse tab of said side links.

10. The apparatus of claim 9, wherein the transverse tab of each of the side links slidingly engages said circumferential groove of each of said upper and lower rollers.

11. The apparatus of claim 9, wherein a pair of articulated members are provided for coupling to said spindle of each of said roller assemblies, whereby said articulated members allow for the adjustment of the relative angular position of said roller assemblies for placement along said curved section.

12. The apparatus of claim 11, wherein a radially extending cross bracket is provided for attachment between a selected articulated member and said guide rail, whereby said cross bracket assists in supporting said plurality of roller assemblies.

13. An active guide rail for supporting a side-flexing, endless modular link conveyor belt including side links having a depending arm carrying an inwardly extending transverse tab, said guide rail comprising at least one roller assembly having an upper roller and a lower roller, each of said rollers having a circumferential groove for receiving and engaging the transverse tab of the side link on at least one side of the conveyor belt along a respective forward and return run.

* * * * *

UNITED STATES PATENT AND TRADEMARK OFFICE
CERTIFICATE OF CORRECTION

PATENT NO. : 6,129,202
DATED : October 10, 2000
INVENTOR(S) : James L. Layne et al.

It is certified that error appears in the above-identified patent and that said Letters Patent is hereby corrected as shown below:

Column 10:
Line 12, delete "passive".
In the drawings, insert ne Figures 1, 3 and 6.

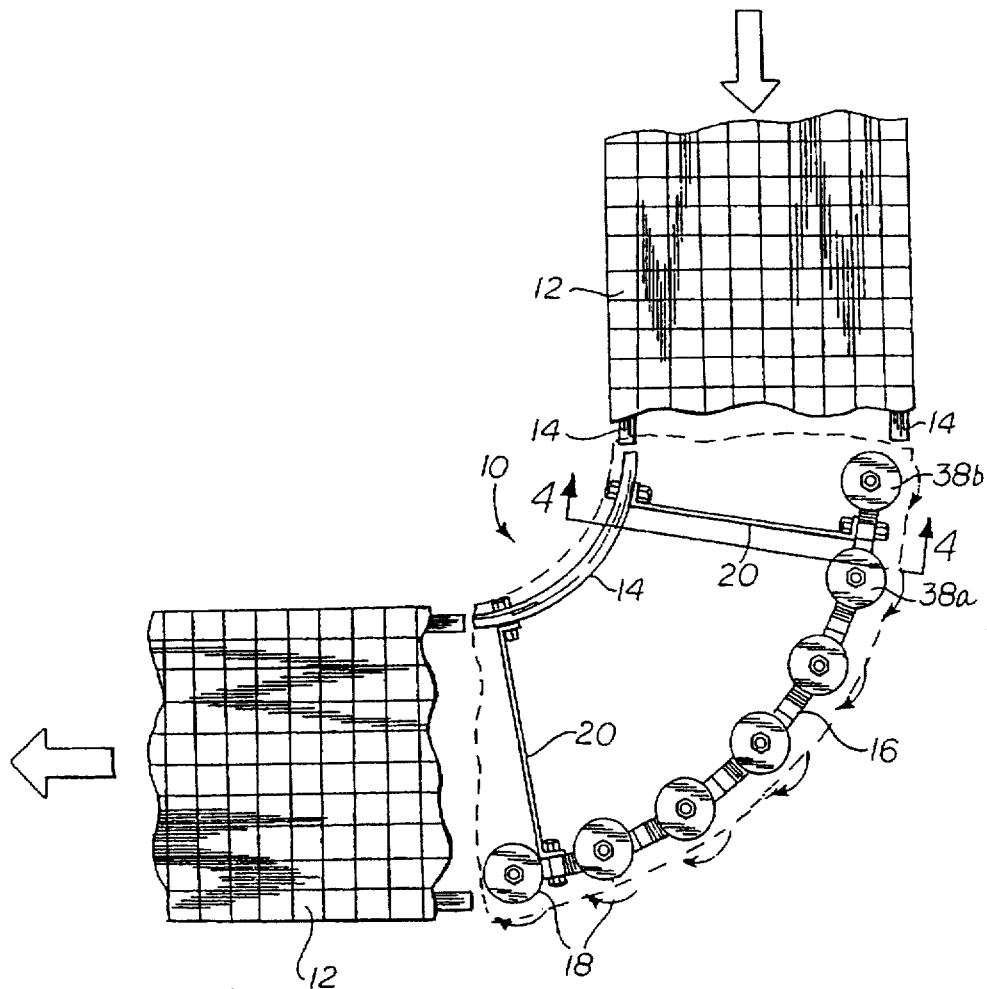

UNITED STATES PATENT AND TRADEMARK OFFICE
CERTIFICATE OF CORRECTION

PATENT NO. : 6,129,202
DATED : October 10, 2000
INVENTOR(S) : James L. Layne et al.

It is certified that error appears in the above-identified patent and that said Letters Patent is hereby corrected as shown below:

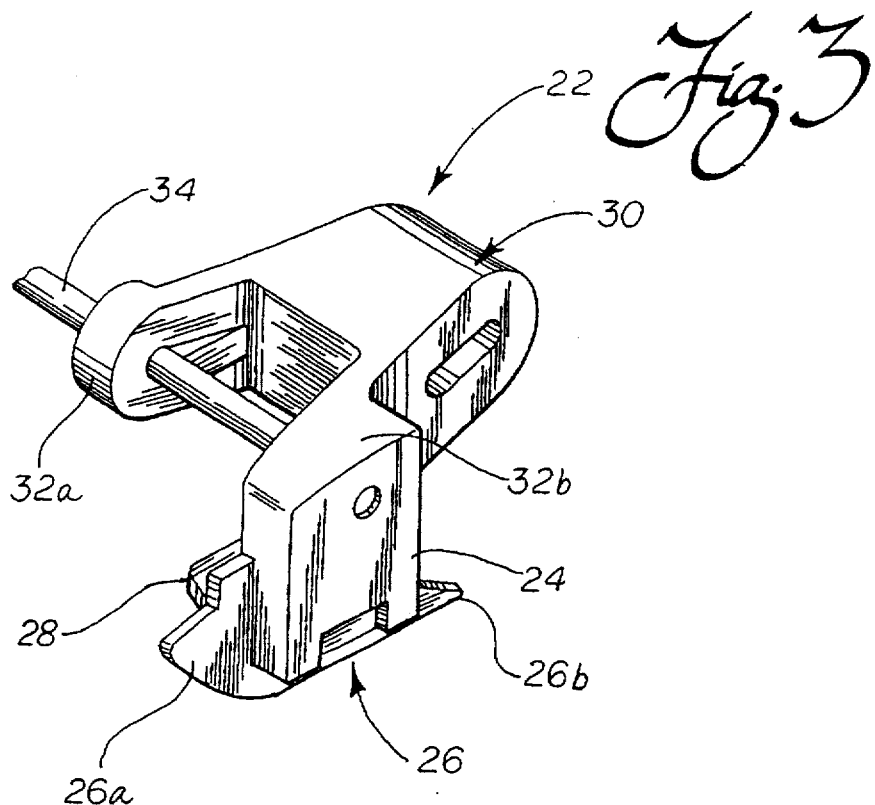

UNITED STATES PATENT AND TRADEMARK OFFICE
CERTIFICATE OF CORRECTION

PATENT NO. : 6,129,202
DATED : October 10, 2000
INVENTOR(S) : James L. Layne et al.

It is certified that error appears in the above-identified patent and that said Letters Patent is hereby corrected as shown below:

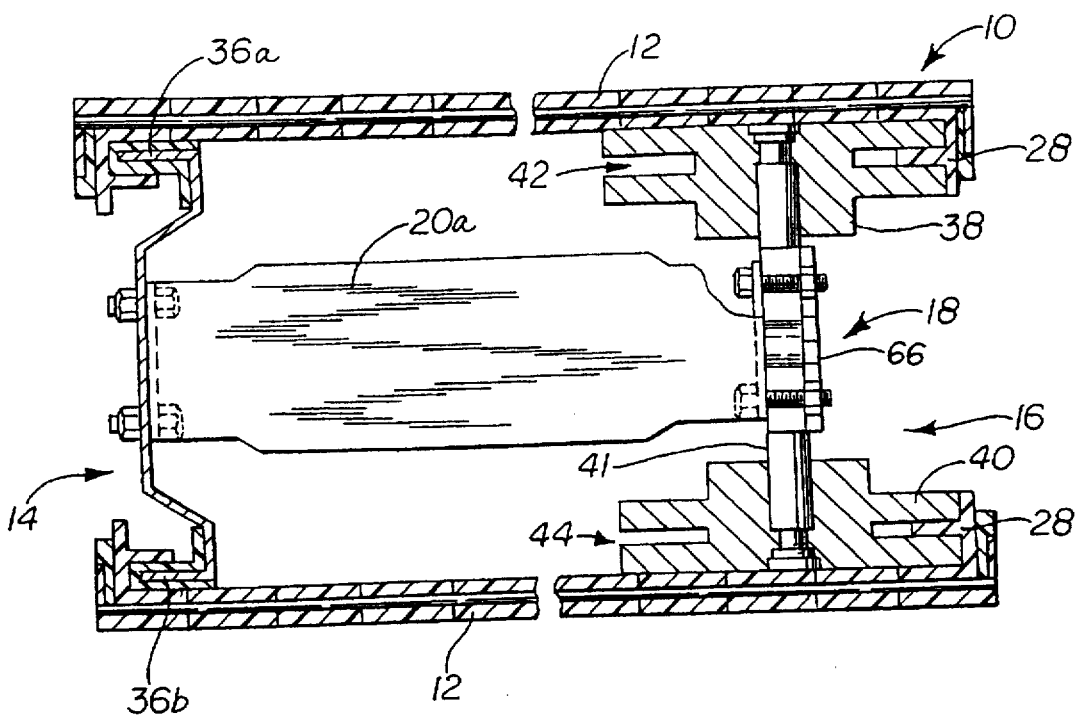

Fig. 4

UNITED STATES PATENT AND TRADEMARK OFFICE
CERTIFICATE OF CORRECTION

PATENT NO. : 6,129,202
DATED : October 10, 2000
INVENTOR(S) : James L. Layne et al.

It is certified that error appears in the above-identified patent and that said Letters Patent is hereby corrected as shown below:

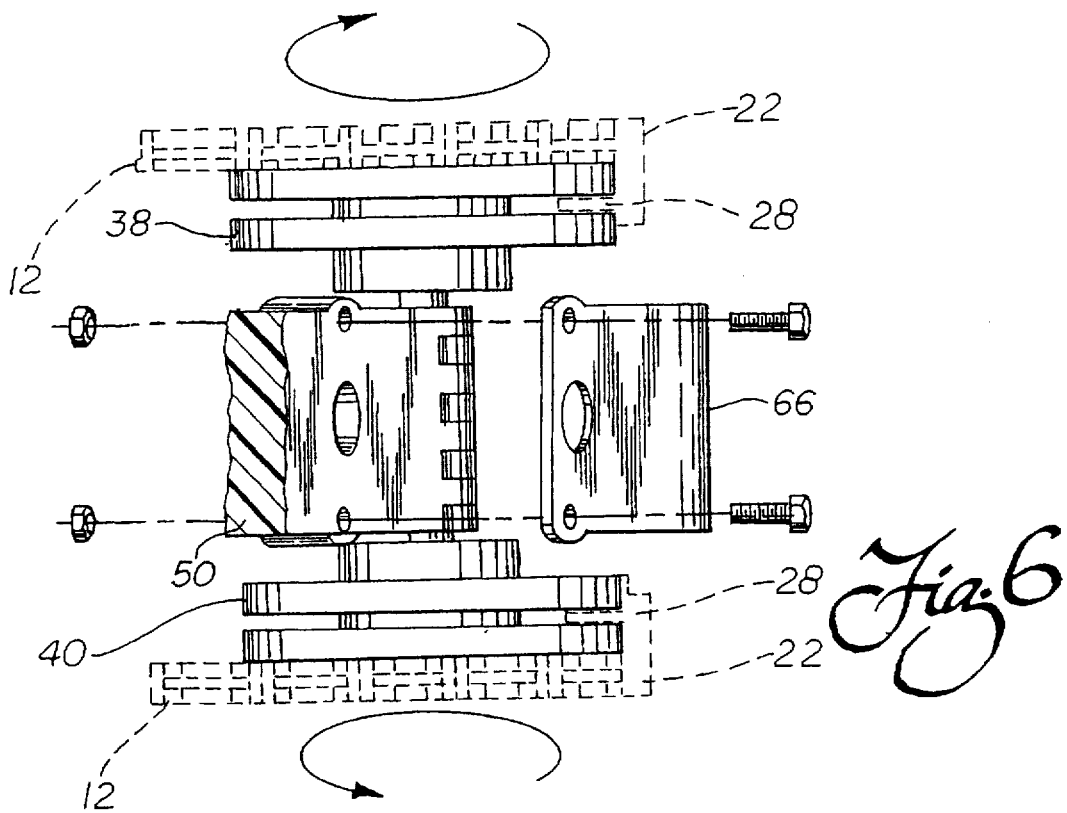

Fig. 6

UNITED STATES PATENT AND TRADEMARK OFFICE
CERTIFICATE OF CORRECTION

PATENT NO. : 6,129,202
DATED : October 10, 2000
INVENTOR(S) : James L. Layne et al.

It is certified that error appears in the above-identified patent and that said Letters Patent is hereby corrected as shown below:

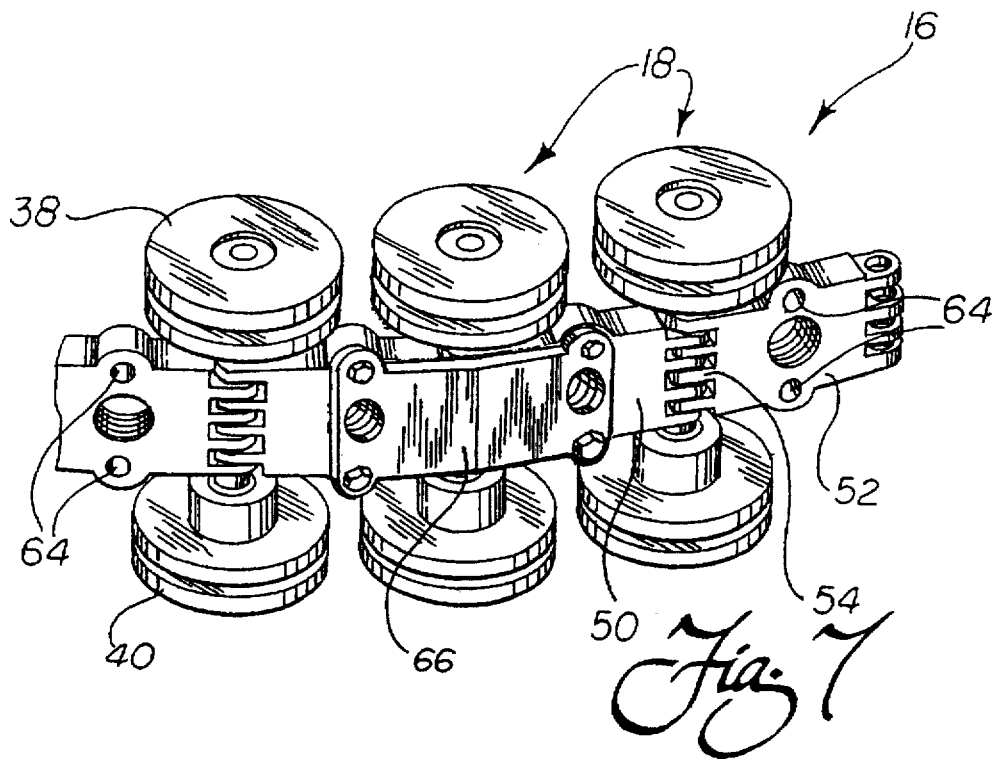

Signed and Sealed this

Third Day of July, 2001

Attest:

*Attesting Officer*

NICHOLAS P. GODICI
*Acting Director of the United States Patent and Trademark Office*